United States Patent [19]
Jansen et al.

[11] Patent Number: 6,080,831
[45] Date of Patent: Jun. 27, 2000

[54] WATER-DISPERSIBLE POLYISOCYANATES

[75] Inventors: Bernhard Jansen, Köln; Joachim König; Bernd Thiele, both of Odenthal; Jürgen Reiners; Rolf-Volker Meyer, both of Leverkusen, all of Germany

[73] Assignee: Bayer Aktiengesellschaft, Leverkusen, Germany

[21] Appl. No.: 08/860,144

[22] PCT Filed: Dec. 11, 1995

[86] PCT No.: PCT/EP95/04868

§ 371 Date: Jun. 19, 1997

§ 102(e) Date: Jun. 19, 1997

[87] PCT Pub. No.: WO96/20309

PCT Pub. Date: Jul. 4, 1996

[30] Foreign Application Priority Data

Dec. 23, 1994 [DE] Germany ............... 44 46 334

[51] Int. Cl.$^7$ ............... C08G 18/10
[52] U.S. Cl. ............ 528/65; 252/182.22; 428/425.1; 560/26; 560/115; 560/158; 527/301
[58] Field of Search .......... 252/182.22; 428/425.1; 560/26, 115, 158; 528/65; 527/301

[56] References Cited

U.S. PATENT DOCUMENTS

| | | | |
|---|---|---|---|
| 3,505,001 | 4/1970 | Wagner .................. | 8/192 |
| 3,645,942 | 2/1972 | Brown et al. ............. | 523/142 |
| 3,969,394 | 7/1976 | Reader .................. | 528/59 |
| 5,503,714 | 4/1996 | Reiners et al. ........... | 162/135 |

FOREIGN PATENT DOCUMENTS

| | | |
|---|---|---|
| 0074544 | 3/1983 | European Pat. Off. . |
| 0478216 | 4/1992 | European Pat. Off. . |
| 0582166 | 2/1994 | European Pat. Off. . |
| 2096740 | 2/1972 | France . |
| 207727 | 3/1984 | Germany . |
| 4211480 | 10/1993 | Germany . |

*Primary Examiner*—Rachel Gorr
*Attorney, Agent, or Firm*—Norris, McLaughlin & Marcus, P.A.

[57] ABSTRACT

Cellulose-containing, optionally wood-containing materials which have been obtained using water-dispersible polyisocyanates which in turn have been prepared by reaction of the following starting components:

a) modified polyisocyanates of the formula (I)

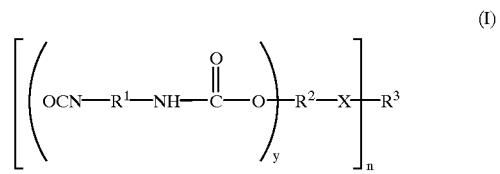

in which:
R$^1$ denotes an aliphatic hydrocarbon radical having 2 to 18 carbon atoms; a cycloaliphatic hydrocarbon radical having 4 to 15 carbon atoms; an aromatic hydrocarbon radical having 6 to 15 carbon atoms or an araliphatic hydrocarbon radical having 8 to 15 carbon atoms, R$^2$ denotes an aliphatic hydrocarbon radical which has 10 to 35 carbon atoms and optionally contains double bonds, R$^3$ denotes a hydrocarbon radical which is at least divalent and can also be heterocyclic, with inclusion of the ester oxygen or amide nitrogen from X,

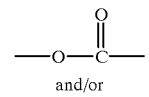
and/or

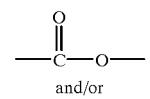
and/or

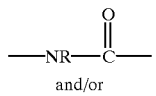
and/or

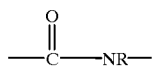

where R=H or C$_1$–C$_4$-alkyl, or R is a constituent of a cyclic structure, n denotes a number ≧2 and y denotes a number ≧1, b) non-modified polyisocyanates,
c) polyethylene oxide polyether alcohols optionally containing ester groups,
d) optionally cycloaliphatic and/or aliphatic amines which optionally contain ether, ester or amide groups, have at least one functional group which is reactive towards isocyanates and contain at least one tertiary amino group and/or ammonium group.

5 Claims, No Drawings

WATER-DISPERSIBLE POLYISOCYANATES

The invention relates to repulpable cellulose-containing, optionally wood-containing materials which can be prepared using water-dispersible polyisocyanates.

EP-A 0 074 544 describes aqueous dispersions of 1. a concentrated rosin size and 2. hydrophobic ketene dimer or hydrophobic isocyanates having at least 12 C atoms. These dispersions are obtained by using a cationic dispersing agent.

A process for exclusive wet strength treatment of paper with the aid of water-dispersible polyisocyanate mixtures which contain 2 to 20% by weight of ethylene oxide units arranged in the form of polyether chains, these chains having a statistical average of 5 to 70 ethylene oxide units, is also known from DE-A 4 211 480.

EP-A 0 582 166 describes the use of polyisocyanates containing tertiary amino groups and/or ammonium groups and 0 to 30% by weight (based on the mixture) of ethylene oxide units in the form of potyether chains, with the aim of preparing cellulose-containing materials which have been given a dry strength and wet strength treatment and/or have been sized.

All papers produced using polyisocyanates in the pulp or treated using polyisocyanates in the surface have the common feature that, depending on the amount used, they are difficult to repulp or cannot be repulped at all. It is indeed the point of the wet strength treatment of the paper to ensure mechanical strength when the paper is wet through with water; repulpability, for example in water or dilute aqueous alkaline solutions, is therefore in general not possible. On the other hand, recycling of production waste from paper, card and paperboard production (for example edge trimmings, other trimmings and incorrect batches) is expedient and necessary. There is therefore a need for a water-dispersible polyisocyanate which guarantees wet strength as well as dry strength and also has a sizing action, and at the same time imparts repulpability to the cellulose-containing and optionally wood-containing material under the conditions of papermaking.

The invention relates to cellulose-containing, optionally wood-containing materials which have been obtained using water-dispersible polyisocyanates, which are in turn prepared by reaction of the following starting components:

a) modified polyisocyanates of the formula (I)

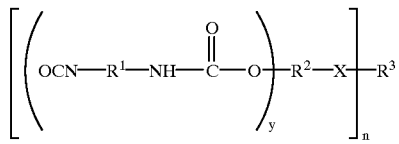

in which:
$R^1$ denotes an aliphatic hydrocarbon radical having 2 to 18 carbon atoms; a cycloaliphatic hydrocarbon radical having 4 to 15 carbon atoms; an aromatic hydrocarbon radical having 6 to 15 carbon atoms or an araliphatic hydrocarbon radical having 8 to 15 carbon atoms, $R^2$ denotes an aliphatic hydrocarbon radical which has 10 to 35 carbon atoms and optionally contains double bonds, $R^3$ denotes a hydrocarbon radical which is at least divalent and can also be heterocyclic, optionally with inclusion of the ester oxygen or amide nitrogen from X, X denotes

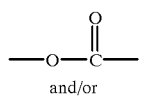

and/or

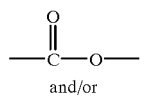

and/or

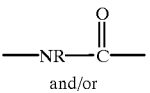

and/or

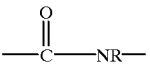

where R=H or $C_1$–$C_4$-alkyl, or a constituent of a cyclic structure, n denotes a number $\geq 2$ and y denotes a number $\geq 1$, b) non-modified polyisocyanates, c) polyethylene oxide polyether alcohols optionally containing ester groups, d) optionally cycloaliphatic and/or aliphatic amines which optionally contain ether, ester or amide groups, have at least one functional group which is reactive towards isocyanates and contain at least one tertiary amino group and/or ammonium group.

The invention preferably relates to:
cellulose-containing, optionally wood-containing materials which have been obtained using water-dispersible polyisocyanates which in turn have been prepared by using modified polyisocyanates of the formula (II)

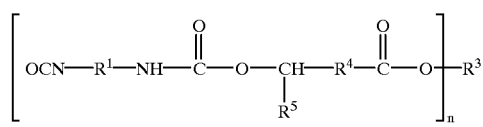

in which
$R^1$ and $R^3$ have the abovementioned meanings,
$R^4$ denotes an aliphatic hydrocarbon radical which has 1 to 18 carbon atoms and optionally contains at least one double bond,
$R^5$ denotes an aliphatic hydrocarbon radical having 1 to 18 carbon atoms or hydrogen and
n has the abovementioned meaning.

Another preferred embodiment are cellulose-containing, optionally wood-containing materials which have been obtained using water-dispersible poly-isocyanates which have in turn been prepared by using modified polyisocyanates of the formula (III):

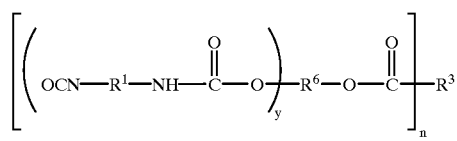

in which

R¹ and R³ have the abovementioned meanings,

R⁶ denotes an aliphatic hydrocarbon radical having 2 to 15 carbon atoms and/or a radical of the formula (VII)

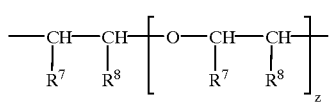

(VII)

in which

R⁷ and R⁸ represent methyl or hydrogen, but one of the two radicals always denotes hydrogen, and z represents a number from 1 to 5, n represents a number $\geq 2$ and y represents a number $\geq 1$.

The invention furthermore relates to a process for the preparation of water-dispersible polyisocyanates, which is characterized in that the following are reacted with one another in any desired sequence:

a) modified polyisocyanates of the formula (I), b) non-modified polyisocyanates, c) polyethylene oxide polyether alcohols optionally containing ester groups, d) optionally cycloaliphatic and/or aliphatic amines which optionally contain ether, ester or amide groups, have at least one functional group which is reactive towards isocyanates and contain at least one tertiary amino group and/or ammonium group.

Preferred embodiments of the process start from modified polyisocyanates of the formulae (II) and (III).

The invention likewise relates to modified polyisocyanates of the formulae (II) and (III) themselves.

The term "water-dispersible" in connection with the polyisocyanates according to the invention means that the polyisocyanates are those which, in a concentration of up to 70% strength by weight, preferably up to 50% strength by weight, in water, give finely divided dispersions with particle sizes of <500 nm.

The water-dispersible polyisocyanates according to the invention can be prepared as follows:

a) The modified polyisocyanates of the formula (I) are reaction products of diisocyanates OCN—R¹—NCO with polyhydroxy compounds of the formula (IV):

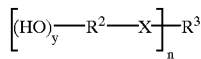

(IV)

in which R¹, R², R³, X, Y and n have the abovementioned meaning (but X=X=

is less preferred).

Aliphatic, cycloaliphatic, araliphatic and aromatic diisocyanates are particularly suitable, for example: 1,4-diisocyanatobutane, 1,6-diisocyanatohexane, 1,5-diisocyanato-2,2-dimethyl-pentane, 2,2',4"-and 2,4',4"-trimethyl-1,6-diisocyanato-hexane, 1,3- and 1,4-diisocyanatocyclohexane, 1-isocyanato-3,3,5-trimethyl-5-isocyanatomethylcyclohexane, 1-isocyanato-1-methyl-4-isocyanatomethylcyclohexane, 4,4'-diisocyanatohexylmethane, 2,2'-, 2,4'- and 4,4'-diisocyanatodiphenylmethane, 2,4- and 2,6-diiso-cyanatotoluene and 1,5-diisocyanatonaphthalene and any desired mixtures of these diisocyanates.

The polyhydroxy compounds of the formula (IV) can be

α) as shown in formula (II), the reaction product of a polyalcohol with a hydroxyl-functional fatty acid, according to formula (V)

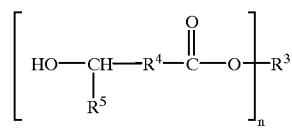

(V)

in which R³, R⁴, R⁵ and n have the abovementioned meaning. Possible polyalcohols are polyhydric alcohols, for example ethylene glycol, propylene glycol, diethylene glycol, triethylene glycol, glycerol, trimethylolpropane, pentaerythritol, sorbitol, mannitol or cane sugar.

Possible hydroxyl-functional fatty acids are:

Naturally occurring substances, such as ricinoleic acid and hydration products of unsaturated fatty acids, such as are described in P. Karrer, Lehrbuch der organischen Chemie [Textbook of Organic Chemistry], G. Thieme Verlag, 1954, page 208, centre, which can still contain double bonds (cf. definition of R⁴), β) as shown in formula (III), the reaction product of a polycarboxylic acid with a polyol characterized by formula (VI)

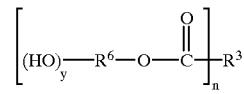

(VI)

in which R³, R⁶, y and n have the abovementioned meaning.

Possible polycarboxylic acids are carboxylic acids having 2 or more carboxyl functions, such as malonic acid, oxalic acid, succinic acid, glutaric acid, adipic acid, suberic acid, azelaic acid, sebacic acid, dodecanedioic acid, fumaric acid, maleic acid, itaconic acid, 1,2,3,4-butanetetracarboxyic acid, dimer fatty acid and trimer fatty acid, as described in "The Dimer Acids", edited by Edward C. Leonard, Humko Sheffield Chemical, 1975, hexahydrophthalic acid, camphoric acid, HET acid, (1,4,5,6,7,7-hexachloro-bicyclo[2,2,1]hept-5-en-2,3-dicarboxylic acid) phthalic acid and isomers thereof, trimesic acid, pyromellitic acid, cyclopentanetetracarboxylic acid and 1,4,5,8-naphthalenetetracarboxylic acid.

Polyols which may be mentioned as examples are: triethylene glycol, di-propylene glycol, ethylene glycol, propylene glycol, butane-1,4-diol, hexane-1,4-diol, diethylene glycol and neopentylglycol, and also polyethylene glycol, as well as polypropylene glycol, 1,3-propanediol, 1,5-pentanediol, 2,3-butanediol, 2,5-hexanediol, 3-methyl-1,5-pentanediol, butylene-1,4-diol, 2-methyl-2-propyl-1,3-propanediol, 2-ethyl-1,3-hexanediol, 2,5-dimethyl-2,5-hexanediol, 2,2,4-trimethyl-1,3-pentanediol, 1,12-octadecanediol, 2-butyne-diol and all the other polyols mentioned in section α).

The polyhydroxy compounds of the formula (IV) are obtained from the abovementioned starting compounds by esterification in a manner known per se. The reaction with the diisocyanate to give the modified polyisocyanates of the formulae II and III is also carried out in a manner known per se.

b) Non-modified polyisocyanates which can be used are: aliphatic, cycloaliphatic, araliphatic or aromatic isocyanates having an NCO functionality of 1.8 to 4.2. Polyisocyanates which contain uretdione and/or isocyanurate and/or allophanate and/or biuret and/or oxadiazine structures and which are accessible in a known manner from aliphatic, cycloaliphatic, araliphatic or aromatic diisocyanates are preferably used.

These are preferably polyisocyanate mixtures which essentially comprise trimeric 1,6-diisocyanatohexane or 1-isocyanato-3,3,5-trimethyl-5-isocyanato-methylcyclohexane and the corresponding higher homologues, contain iso-cyanurate groups and optionally uretdione groups and have an NCO content of 19 to 24% by weight. The corresponding polyisocyanates of the NCO content mentioned which are largely free from uretdione groups and contain isocyanurate groups and are obtained by catalytic trimerization, which is known per se, of 1,6-diisocyanatohexane or 1-isocyanato-3,3,5-trimethyl-5-isocyanatomethyl-cyclohexane to form isocyanurate and which preferably have an (average) NCO functionality of 3.2 to 4.2 are particularly preferred. The trimeric polyisocyanates which have an NCO content of 19 to 24% by weight, are obtained by reaction of 1,6-diisocyanatohexane with less than the equivalent amount of water in a known manner and essentially contain biuret groups are also preferred.

c) Polyalkylene oxide polyether alcohols optionally containing ester groups are mono- or polyfunctional polyalkylene oxide polyether alcohols which contain a statistical average of 5 to 70, preferably 6 to 60 ethylene oxide units per molecule, such as are accessible in a manner known per se by alkoxylation of suitable starter molecules.

To prepare these polyalkylene oxide polyether alcohols, any desired mono- or polybasic alcohols of the molecular weight range from 32 to 150 g/mol, such as are also used, for example, in accordance with EP-A 0 206 059, can be employed as starting molecules. Monofunctional aliphatic alcohols having 1 to 4 carbon atoms are preferably used as starter molecules. The use of methanol or ethylene glycol monomethyl ether is particularly preferred. Alkylene oxides which are suitable for the alkoxylation reaction are, in particular, ethylene oxide and propylene oxide, which can be employed in the alkoxylation reaction in any desired sequence or also as a mixture.

The abovementioned polyalkylene oxide polyether alcohols are either pure polyethylene oxide polyethers or mixed polyalkylene oxide polyethers which contain at least one polyether sequence which has at least 5, in general 5 to 70, preferably 7 to 60, and particularly preferably 7 to 20, ethylene oxide units, and the alkylene oxide units of which consist of ethylene oxide units to the extent of at least 60 mol %, preferably to the extent of at least 70 mol %. Preferred polyalkylene oxide polyether alcohols of this type are monofunctional polyalkylene oxide polyethers which are started on an aliphatic alcohol containing 1 to 4 carbon atoms and contain a statistical average of 7 to 60 ethylene oxide units. Particularly preferred polyalkylene oxide polyether alcohols are pure polyethylene glycol monomethyl ether alcohols which contain a statistical average of 7 to 20 ethylene oxide units.

Suitable polyalkylene oxide polyethers which contain ester groups are OH-terminated polyester ethers which are obtainable by reaction of aliphatic C2- to C8-dicarboxylic acids or esters or acid chlorides thereof with polyethers from the group consisting of polyethylene oxides, polypropylene oxides or mixtures or mixed polyethers thereof, 0.8 to 0.99 equivalent of carboxyl groups or derivatives thereof being employed per OH equivalent of the polyether, and which have an average molecular weight of less than 10,000 g/mol, preferably less than 3000 g/mol, and contain hydroxyl end groups.

d) For the amines mentioned under d), the following may be given as examples:
N,N'-dimethylethylenediamine, N,N'-dimethylpropylenediamine, dimethylaminohydroxyethane, dimethylaminohydroxypropane, diethylaminohydroxyethane, dibutylaminohydroxyethane, diethylaminoethoxyhydroxyethane, (2-diethylaminoethoxy)-ethoxyhydroxyethane, N,N'-triethyl-N'-[ω-hydroxy-tetraethoxyethyl]propylenediamine, N-hydroxyethyl-morpholine, N-hydroxy-ethyl-methylpiperazine, N-hydroxyethylpiperidine, N-hydroxyethylpiperidine, N-hydroxyethylpyrrolidine, 4-hydroxy-N-methylpiperidine, 4-hydroxy-1-dimethylaminocyclohexane, 1,3-bis-(dimethylamino-ethoxy)-2-hydroxy-propane, 1,3-bis-(dimethylamino-propoxy)-2-hydroxypropane and all other amines mentioned as examples in EP-A 0 582 166, and furthermore also all other compounds which contain amino functions and optionally hydroxyl functions and are mentioned in the same Offenlegungsschrift (page 10 top to page 15, line 25).

The amines with several functional groups which are reactive towards isocyanate in general preferably have an average molecular weight of less than 10,000 g/mol.

Those having an average molecular weight of less than 5000 g/mol, in particular less than 3000 g/mol, are particularly preferred.

However, it is also possible to use compounds which contain ammonium groups by protonation and/or quaternization and are reactive towards isocyanates, examples which may be mentioned being: the compounds obtainable by reaction of acids or alkylating agents with the abovementioned amines d), all or some of the tertiary amino groups of which have been converted into ammonium groups.

Acids which are suitable for this reaction are preferably acetic acid, formic acid and HCl, and possible alkylating agents are, for example, $C_1$–$C_4$-alkyl chlorides and bromides, as well as dialkyl sulphates, such as dimethyl sulphate or diethyl sulphate.

The water-dispersible polyisocyanates can be prepared by reaction, in any desired sequence, of:

a) modified polyisocyanates of the formula (I), b) non-modified polyisocyanates, c) polyalkylene oxide polyether alcohols which optionally contain ester groups, and optionally d) cycloaliphatic and/or aliphatic amines which optionally contain ether, ester or amide groups and have at least one functional group which is reactive towards isocyanates and at least one tertiary amino group and/or ammonium group.

If the amines d) contain polyether chains, their reaction with the polyisocyanates can also lead directly to water-dispersible polyisocyanates, so that the content of component c) can be reduced, if appropriate. The modified polyisocyanates a) and the non-modified polyisocyanates b) can be employed either separately or as a mixture, also in combination with external ionic or non-ionic emulsifiers. Such emulsifiers are described, for example, in Houben-Weyl, "Methoden der organischen Chemie [Methods of Organic Chemistry]", Thieme-Verlag, Stuttgart (1961), vol. XIV/1, part 1, page 190 to 208, in U.S. Pat. No. 3,428,592 and in EP-A 0 013 112. The emulsifiers are employed in an amount which ensures dispersibility.

If polyisocyanates a) and b) are first reacted with polyalkylene oxide polyether alcohols c) in a manner known per se, an NCO/OH equivalent ratio of at least 2:1 (for example in general from 4:1 to about 1000:1) is preferably maintained, which means that polyether-modified polyisocyanates having an average NCO functionality of 1.8 to 4.2, preferably 2.0 to 4.0, a content of aliphatically or cycloaliphatically bonded isocyanate groups of 1.0 to 21.5% by weight and a content of ethylene oxide units located within polyether chains (calculated as $C_2H_4O$, molecular weight=44 g/mol) of 2 to 20% by weight, the polyether chains containing a statistical average of 5 to 70 ethylene oxide units, are obtained.

The corresponding water-dispersible polyisocyanate mixtures which contain ammonium groups and are obtainable by protonation and/or quaternization of the water-dispersible polyisocyanates are also suitable for carrying out the process according to the invention. Alkylating agents such as, for example, dimethyl sulphate, diethyl sulphate or $C_1$–$C_4$-alkyl halides and -sulphonates can be used for quaternization.

The starting components are reacted in any desired sequence, with exclusion of moisture and preferably without solvent. As the amount of alcohol component increases, the viscosity of the end product also increases, so that in certain cases (if the viscosity rises, for example, above 100 Pas) a solvent which is preferably water-miscible but is inert towards the polyisocyanate can be added. Suitable solvents are:

alkyl ether-acetates, glycol diethers, toluene, carboxylic esters, acetone, methyl ethyl ketone, tetrahydrofuran and dimethylformamide.

The reaction can be accelerated by catalysts which are known per se, such as dibutyltin dilaurate, tin(II) octoate or 1,4-diazabicyclo[2.2.2]octane in amounts of 10 to 1000 ppm, based on the reaction components. The reaction is carried out at temperatures up to 130° C., preferably at 10° C. to 100° C., particularly preferably at 20° C. to 80° C. The reaction can be monitored by titration of the NCO content or by evaluation of the NCO band of the IR spectrum at 2260 to 2275 $cm^{-1}$, and has ended when the isocyanate content is not more than 0.1% by weight above the value which corresponds to complete conversion. Reaction times of less than 24 hours are as a rule sufficient. Solvent-free synthesis is preferred.

The water-dispersible polyisocyanate mixtures are easy to handle industrially and are stable to storage, with exclusion of moisture, for months. They are preferably employed without organic solvents. If appropriate, they can be emulsified very easily in water, if appropriate with the addition of acids and/or at temperatures up to 100° C. The active compound content of the emulsion can be up to 70% by weight. However, it is more advantageous to prepare emulsions having an active compound content of 1 to 50% by weight, which can then be diluted further, if appropriate, before the metering point. The mixing units customary in the art are suitable for the emulsification (stirrers, mixers with the rotor-stator principle and, for example, high pressure emulsifying machines).

The preferred polyisocyanates are self-emulsifying, i.e. they can also easily be emulsified after addition to the aqueous phase without the action of high shearing forces. As a rule, a static mixer is sufficient. The resulting emulsions have a certain processing time, which depends on the structure of the polyisocyanates to be employed according to the invention, in particular on their content of basic N atoms. The processing time of such an aqueous emulsion is as a rule up to 24 hours. The processing time is defined as the time within which the optimum dry and wet strength action is achieved.

To facilitate incorporation into the aqueous phase, it may be expedient to employ the water-dispersible polyisocyanate mixture as a solution in a solvent which is inert towards isocyanate groups. Suitable solvents are, for example, ethyl acetate, ethylene glycol diacetate, propylene glycol diacetate, 2-butanone, 1-methoxypropyl 2-acetate, toluene or mixtures thereof. The content of solvents in the solution of the polyisocyanate should be not more than 80% by weight, preferably not more than 50% by weight. However, the use according to the invention of solvent-free, water-dispersible polyisocyanates is particularly preferred. The cellulose-containing materials which are suitable for the process according to the invention are, for example, paper or paper-like materials, such as paperboard and card. The polyisocyanate mixtures which are preferred for the wet strength and dry strength treatment have an NCO functionality of greater than 2.

For dry and wet strength treatment, the water-dispersible polyisocyanates can be employed in the pulp, and they are then added directly to the cellulose-containing dispersion of the fibrous raw materials. For this, the polyisocyanate mixture is emulsified in water at 20 to 80° C. and the emulsion obtained by this procedure is added to a suspension of the fibrous raw material or is dispersed directly in the suspension of the fibrous materials. The paper is formed from this suspension by dewatering and is then dried. For emulsification of the polyisocyanate mixture, it is expedient to add 1 to 4 times the amount of water. Higher amounts of water are also possible. For treatment of the surface, a finished base paper is treated with an emulsion of the polyisocyanate mixture in water and then dried. Use in the sizing press is possible. In this case, the polyisocyanate mixture emulsified in water is transferred to the finished paper web.

The dry and wet strength effect is achieved immediately after drying. The wet strength effect which can be achieved by surface treatment considerably exceeds that which has been achievable with the wet strength agents known to date at the same dosage of active substance.

It is particularly preferable to meter the aqueous emulsion of the polyisocyanates into the fibrous material in the course of 60 minutes, preferably in the course of 15 minutes. In order to achieve the optimum wet strength under conditions in practice, metering of the polyisocyanate, for example, shortly before the headbox of the papermaking machine is recommended in particular. For testing, sheets of paper having a weight per unit area of 50 to 100 g/$m^2$ are in general formed in the laboratory.

In water, the NCO groups of the polyisocyanate mixtures to be employed according to the invention hydrolyse slowly with evolution of $CO_2$ to give the corresponding amines, which react with some of the NCO groups still present to give urea groups. Advantageously, however, no precipitates occur.

According to the invention, the products can be metered in the pulp into the solid in the pH range from 4 to 10, preferably from 5.5 to 9. Use in the neutral pH range (pH 6 to 7.5) is particularly preferred. In this pH range, some of the tertiary amino groups are present in protonated form. It is also possible to carry out the dispersion with the addition of acid. A cationic charge which is independent of the pH is then obtained if the polyisocyanates obtained by quaternization of the tertiary amino groups are employed. However, quaternization is not necessary for most uses.

The amounts used of the water-dispersible polyisocyanate to be employed according to the invention depend on the effect required. In general, it is sufficient to use amounts of 0.001 to 50% by weight, preferably 0.1 to 10% by weight, particularly preferably 0.1 to 2.0% by weight of active compound, based on the dry fibrous raw material. The dosage of active substance, based on the fibrous raw material, corresponds to that of known wet strength agents of the polyamidoamine-epichlorohydrin type.

The polyisocyanates to be employed according to the invention give ready-to-use papers of good wet strength immediately from the machine. An intensification in the wet strength action can be achieved by storage of the finished paper and/or after-condensation. Generally, however, a higher wet strength can already be achieved from the machine than with conventional wet strength agents. The dry strength is also improved compared with conventional dry strength agents.

The process according to the invention is carried out under the processing temperatures customary in the paper industry. The processing time depends here on the temperature. In the temperature range from 20 to 25° C., the processing time is relatively long. After storage of the aqueous emulsion for 6 hours, the wet strength action still achieves about 70% of the value achieved when the emulsion is used immediately. At a higher temperature, for example at 50° C., processing within 6 hours is advisable. On the other hand, the maximum wet strength action surprisingly depends hardly at all on the contact time with the cellulose. Papers which have been formed immediately and after a contact time of 2 hours after addition of the water-dispersible polyisocyanate to the paper fibrous material each show the same wet strength. The strength of the paper can be adjusted in the desired manner by a suitable choice of the starting components. The process according to the invention is suitable not only for the production of papers with dry strength and water-resistant papers, but also for the production of papers which are resistant to oil and benzine.

The water-dispersible polyisocyanates can be employed in combination with other cationic auxiliaries, such as retention agents, fixing auxiliaries, drying auxiliaries and wet strength agents. In particular, the fixing of fillers can be intensified further by addition of commercially available retention agents of the type of cationic polycondensates and addition polymers, for example polyamides, polyethylenimines, polyamidoamines and polyacrylamides, and dual systems comprising cationic or cationic and anionic and optionally particulate components, such as silica sols and the like.

This is particularly of interest if use in the laminated paper sector is intended. Preferred retention agents in the context of the invention are cationic poly-condensates of polyamines, preferably N-methyl-bis(3-aminopropyl-amine, and alkylene dihatides, preferably dichtoroethane. However, it should be emphasized that the desired wet strength effect can also be achieved without addition of particular fixing auxiliaries. In particular, the strength of the paper can be increased by combination with polysaccharides, such as hydroxyethylcellulose, carboxymethylcellulose, starch, galactomannans or cationic derivatives thereof.

The polyisocyanate mixtures to be employed according to the invention can of course be employed, if appropriate, together with, i.e. at the same time as or in succession to, the abovementioned cationic auxiliaries. However, since many of the auxiliaries contain organically bonded halogen, combination with AOX-free and/or low-AOX auxiliaries is particularly preferred, since chlorine-free paper production is the chief aim.

All the cellulose-containing, optionally wood-containing, materials produced with the aid of the water-dispersible polyisocyanates according to the invention, such as paper, paperboard or card, are repulpable.

This repulping, with the aim of reusing the fibrous raw materials, is possible in various ways.

a) By treatment with alkalis or acids, preferably with alkalis at slightly elevated temperature, 35 to 120° C., preferably 40 to 110° C., if appropriate with the co-use of oxidizing agents, such as $H_2O_2$ or $K_2S_2O_8$.

b) By treatment with ozone in a neutral medium.

c) By treatment with enzymes which cleave ester groups.

d) By treatment with microorganisms which cleave ester groups.

These methods which are known per se lead to a loss in the wet strength of a cellulose-containing material with wet strength, and to the possibility of recovering the fibrous raw materials by pulping the cellulose-containing materials.

Reactions a) to d) usually proceed very smoothly, but a general statement on the reaction times is not possible, since these depend greatly on the degree of wet strength treatment, and for example, on the weight per unit area of the cellulose-containing materials to be repulped. Furthermore, it is possible to prepare chemically or biologically degradable coating compositions, adhesives, binders or plastics with the aid of the water-dispersible polyisocyanates of the formulae (II) and (III), either in bulk or in aqueous suspension.

EMBODIMENT EXAMPLES

1. Preparation of the Modified Polyisocyanates 1.1 Modified Polyisocyanate 1

200 g of refined castor oil (nOH=0.579 mol) are stirred together with 389 g of hexamethylene diisocyanate (nNCO= 4.632 mol) at 80° C. until the isocyanate content has fallen to 28.3%. The excess isocyanate is then removed with the aid of a thin film evaporator; the isocyanate content is 7.9% (theoretic value 8.18%) and the viscosity of 4533 mPas.

1.2 Modified Polyisocyanate 2

100 g of an esterification product of adipic acid and 2 mol of diethylene glycol (OH number=347) are stirred with 390.7 g of isophorone diisocyanate (NCO 3.52 mol) at 80° C. until the isocyanate content is 26.3%. The excess isocyanate is then removed with the aid of a thin film evaporator. A residue of 232.2 g is obtained; the isocyanate content is 9.5% and the product is free-flowing only at elevated temperature.

2. Preparation of the Water-Dispersible Polyisocyanates 2.1 Water-Dispersible Polyisocyanate 1

20 g of modified polyisocyanate 2 are mixed, under the influence of heat, with 45 g of a polyisocyanate which essentially comprises tris-(6-isocyanatohexyl) isocyanurate and higher homologues thereof, is prepared by trimerization of some of the isocyanate groups of 1,6-diisocyanatohexane, contains isocyanate groups and has an NCO content of 20.5%, a content of free 1,6-diisocyanatohexane of less than 0.3% and a viscosity of 1000 mPas (25° C.), and the mixture is reacted, by stirring at 60° C., with 35 g of a polyether based on ethylene oxide which has been started from 2-(2- methoxyethoxy)ethanol and has a number-average molecular weight of 350 g/mol and a hydroxyl number of 160 mg KOH/g. The isocyanate content was 7.1% and the viscosity was 3515 mPas (25° C.).

2.2 Water-Dispersible Polyisocyanate 2

24.7 g of modified polyisocyanate 1 are mixed with 49.5 g of a polyisocyanate prepared, as described under 2.1, by trimerization of 1,6-diisocyanatohexane, and the mixture is reacted with 24.8 g of a poly-ether, as described under 2.1, which has been started from 2-(2-methoxy-ethoxy)ethanol and 1 g of dimethylethanolamine. The isocyanate content was 8.5% and the viscosity was 2733 mPas (25° C.).

2.3 Water-Dispersible Polyisocyanate 3

37.1 g of modified polyisocyanate 1 are mixed with 37.1 g of a polyisocyanate prepared, as described under 2.1, by trimerization of 1,6-diisocyanatohexane, and the mixture is reacted at 60° C. with 24.8 g of polyether, as described under 2.1, which has been started from 2-(2-methoxyethoxy) ethanol and 1 g of dimethylaminoethanol. The iso-cyanate content was 6.5%; the viscosity was 3716 mPas (25° C.).

2.4 Water-Dispersible Polyisocyanate 4

49.5 g of modified polyisocyanate 1 are mixed with 24.7 g of a polyisocyanate prepared, as described under 2.1, by trimerization of 1,6-diisocyanatohexane, and the mixture is reacted at 60° C. with 24.8 g of polyether, as described under 2.1, which has been started from 2-(2-methoxyethoxy) ethanol and 1 g of dimethylaminoethanol. The iso-cyanate content was 4.9%; the viscosity was 4409 mPas (25° C.).

2.5 Water-Dispersible Polyisocyanate 5

(Comparison example without modified isocyanate)

82.2 g of a polyisocyanate prepared, as described under 2.1, by trimerization of 1,6-diisocyanatohexane are reacted at 60° C. with 16.9 g of a polyether, as described under 2.1, started from 2-(2-methoxyethoxy)ethanol and 1 g of dimethylaminoethanol. The isocyanate content was 14.1%; the viscosity was 3500 mPas (25° C.).

3. Production of Paper and Testing of the Wet Strength

A mixture of 80% of bleached pine sulphate pulp and 20% of bleached birch sulphate pulp is beaten to a freeness of 38° SR in a beater at a consistency of 2.5%. 100 g portions of the resulting pulp suspension are then diluted with water to a volume of 1000 ml in glass beakers.

0.4% by weight and 0.8% by weight of the water-dispersible isocyanates prepared, based on the solid, are added, after prior dispersion in water (dispersion containing 20% by weight of polyisocyanate), to the pulp dispersions and these dispersions are stirred for a further 3 minutes after the addition.

Sheets of paper having a weight per unit area of about 80 g/m² are then formed with the contents of the glass beakers on a sheet former (Rapid Köthen apparatus). The sheets of paper are dried at 85° C. under a vacuum of 20 mm Hg for 8 minutes and after-heated at 110° C. in a drying cabinet for a further 10 minutes. After climatic fixing, 5 test strips 1.5 cm wide are cut out of each sheet of paper and immersed in distilled water for 5 minutes. The wet strips are then tested immediately for their wet breaking load on a tensile tester. The test results are summarized in the following Table 1.

TABLE 1

Wet breaking load when used in the pulp; after condensation at 110° C.

| Use Example no | Water-dispersible isocyanate no. | NCO % | Wet breaking load with use of 0.4%/0.8% [N] | Comments |
| --- | --- | --- | --- | --- |
| 1 | 1 | 7.1 | X/X | According to the invention |
| 2 | 2 | 8.5 | 8.8/12 | |
| 3 | 3 | 6.6 | 8.6/12 | |
| 4 | 4 | 4.9 | 7.7/11.5 | |
| 5 | 5 | 14.1 | 12.5/13.7 | Comparison |

X: Values not determined (Table 1).

X: Values not determined (Table 1).

4. Repulping Experiments in an Alkaline Medium

The sheets of paper produced under point 3 are torn into small pieces and 0.5 g portions of paper are stirred in 100 ml of 2N NaOH at 90 to 95° C. The following table (Table 2) provides information on the start of clouding of the aqueous phase and on the time for complete pulping.

TABLE 2

Repulping experiments on paper samples from Use Examples 1 to 5.

| Paper from Use Example no. | Water-dispersible isocyanate no. | Start of clouding after (hours) with use of 0.4%/0.8% | complete pulping after (hours) with use of 0.4%/0.8% | Comments |
| --- | --- | --- | --- | --- |
| 1 | 1 | XX/XX | 5/4 | According to the invention |
| 2 | 2 | 1½/1 | 5½/3½ | |
| 3 | 3 | 1½/¼ | 5½/2½ | |
| 4 | 4 | ½/1 | 3½/4½ | |
| 5 | 5 | X/X | X/X | Comparison |

X neither clouding nor pulping detected
XX no values determined.

X neither clouding nor pulping detected

XX no values determined.

5. Repulping Experiments by Ozonolysis 0.27 g of paper in small pieces, produced using 0.8% of water-dispersible polyisocyanate 3 (Use Example 3), is initially introduced into 300 ml of water in a round-bottomed flask with a gas inlet and outlet tube, and an ozone/air mixture is introduced into the flask for 6 hours.

An apparatus from Sander, model 500, was used as the ozonizer. The stream of air to the ozonizer was regulated to a speed of 150 l/hour. An ozone content of 450 mg of $O_3$/hour was determined by calibration measurements. After 6 hours, the paper was pulped completely apart from a few small specks.

We claim:

1. Water-dispersible polyisocyanates which are obtained by reaction of the following starting components:

a) modified polyisocyanates which consist essentially of modified polyisocyanates of the formula (I)

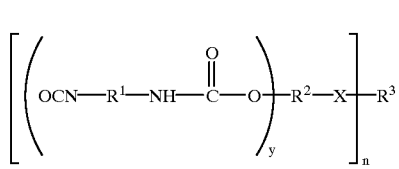

in which:
- $R^1$ denotes an aliphatic hydrocarbon radical having 2 to 18 carbon atoms; a cycloaliphatic hydrocarbon radical having 4 to 15 carbon atoms; an aromatic hydrocarbon radical having 6 to 15 carbon atoms or an araliphatic hydrocarbon radical having 8 to 15 carbon atoms,
- $R^2$ denotes an aliphatic hydrocarbon radical which has 10 to 35 carbon atoms and optionally contains double bonds,
- $R^3$ denotes a hydrocarbon radical which is at least divalent and can also be heterocyclic, or which, together with the ester oxygen or amide nitrogen of X, forms a heterocyclic radical,
- X denotes

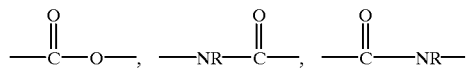

or a combination thereof, where $R=H$ or $C_1$–$C_4$-alkyl, or a constituent of a cyclic structure,
n denotes a number $\geq 2$ and y denotes a number $\geq 1$,
b) non-modified polyisocyanates,
c) polyethylene oxide polyether alcohols optionally containing ester groups,
d) optionally cycloaliphatic and/or aliphatic amines which optionally contain ether, ester or amide groups, have at least one functional group which is reactive towards isocyanates and contain at least one tertiary amino group and/or ammonium group.

2. Water-dispersible polyisocyanates according to claim 1, which are obtainaed by using modified polyisocyanates a) which consist essentially of modified polyisocyanates of the formula (II):

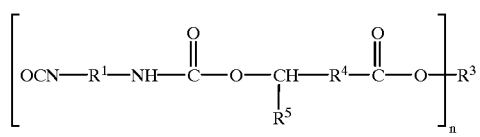

in which
- $R^1$ and $R^3$ have the abovementioned meanings,
- $R^4$ denotes an aliphatic hydrocarbon radical which has 1 to 18 carbon atoms and optionally contains at least one double bond,
- $R^5$ denotes an aliphatic hydrocarbon radical having 1 to 18 carbon atoms or hydrogen and
- n has the abovementioned meaning.

3. A process for the preparation of the water-dispersible polyisocyanates of claim 1, wherein the following compounds are reacted with one another in any desired sequence:
a) modified polyisocyanates which consist essentially of modified polyisocyanates of the formula (I)

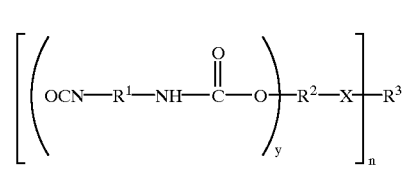

in which:
- $R^1$ denotes an aliphatic hydrocarbon radical having 2 to 18 carbon atoms; a cycloaliphatic hydrocarbon radical having 4 to 15 carbon atoms; an aromatic hydrocarbon radical having 6 to 15 carbon atoms or an araliphatic hydrocarbon radical having 8 to 15 carbon atoms,
- $R^2$ denotes an aliphatic hydrocarbon radical which has 10 to 35 carbon atoms and optionally contains double bonds,
- $R^3$ denotes a hydrocarbon radical which is at least divalent and can also be heterocyclic, or which, together with the ester oxygen or amide nitrogen of X, forms a heterocyclic radical,
- X denotes

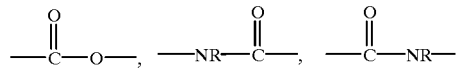

or a combination thereof, where $R=H$ or $C_1$–$C_4$-alkyl, or a constituent of a cyclic structure,
n denotes a number $\geq 2$ and y denotes a number $\geq 1$,
b) non-modified polyisocyanates,
c) polyethylene oxide polyether alcohols optionally containing ester groups,
d) optionally cycloaliphatic and/or aliphatic amines which optionally contain ether, ester or amide groups, and contain at least one tertiary amino group and/or ammonium group.

4. The process according to claim 3, wherein the compounds employed as a) are modified polyisocyanates which consist essentially of modified polyisocyanates of the formula (II)

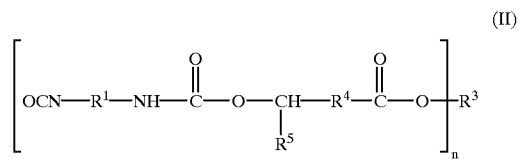

in which
- $R^1$ and $R^3$ have the abovementioned meanings,
- $R^4$ denotes an aliphatic hydrocarbon radical which has 1 to 18 carbon atoms and optionally contains at least one double bond,
- $R^5$ denotes an aliphatic hydrocarbon radical having 1 to 18 carbon atoms or hydrogen and
- n has the abovementioned meaning.

5. Cellulose-containing materials comprising the water-dispersible polyisocyanates according to claim 1.

* * * * *